June 15, 1943.　　　H. SCHRIEVER　　　2,321,776
FILTER FOR MILK AND THE LIKE
Filed May 16, 1942　　　2 Sheets-Sheet 1
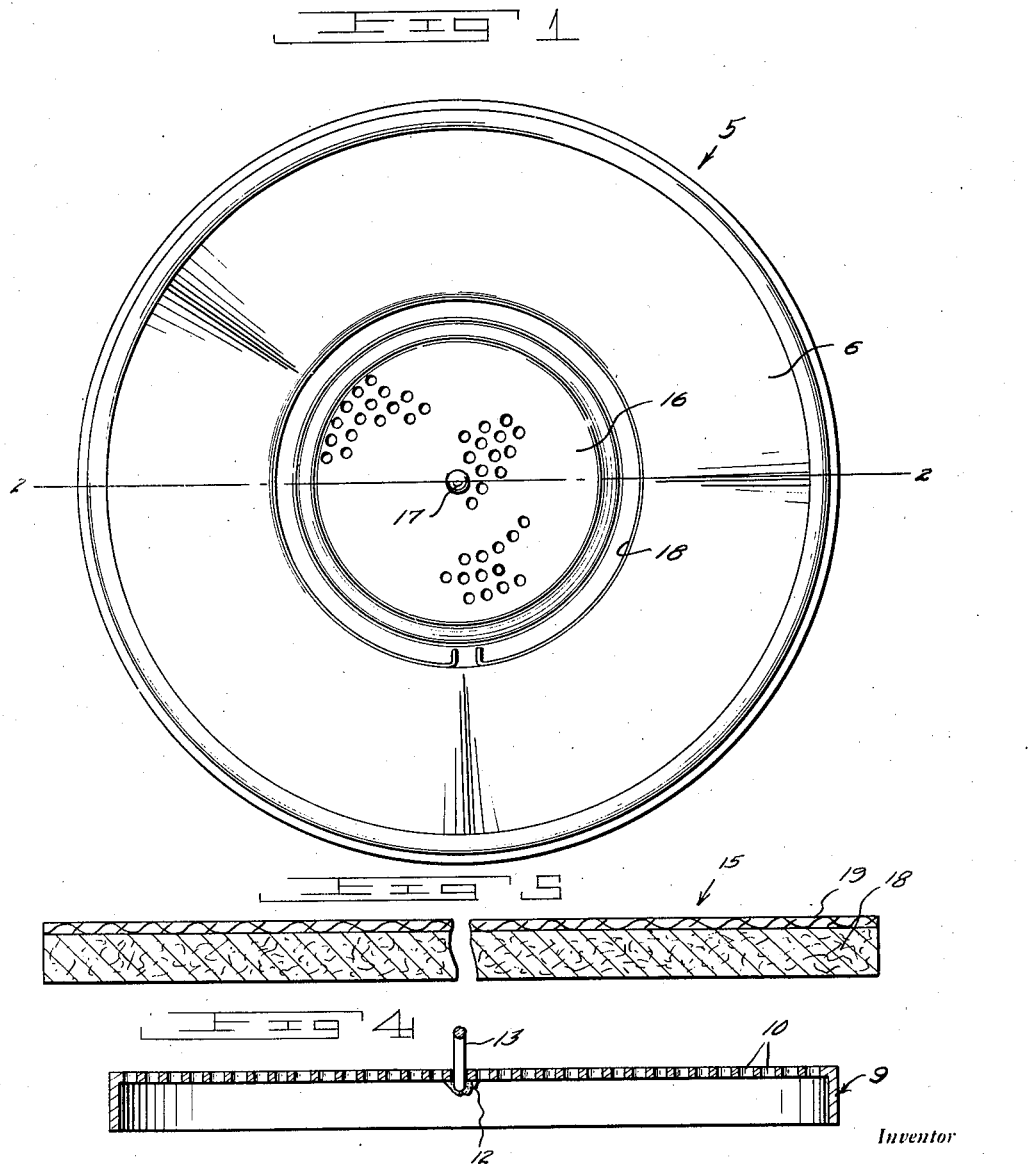
Inventor
Henry Schriever
By Clarence A. O'Brien
and Harvey B. Jacobson, Attorney June 15, 1943.   H. SCHRIEVER   2,321,776
FILTER FOR MILK AND THE LIKE
Filed May 16, 1942   2 Sheets-Sheet 2
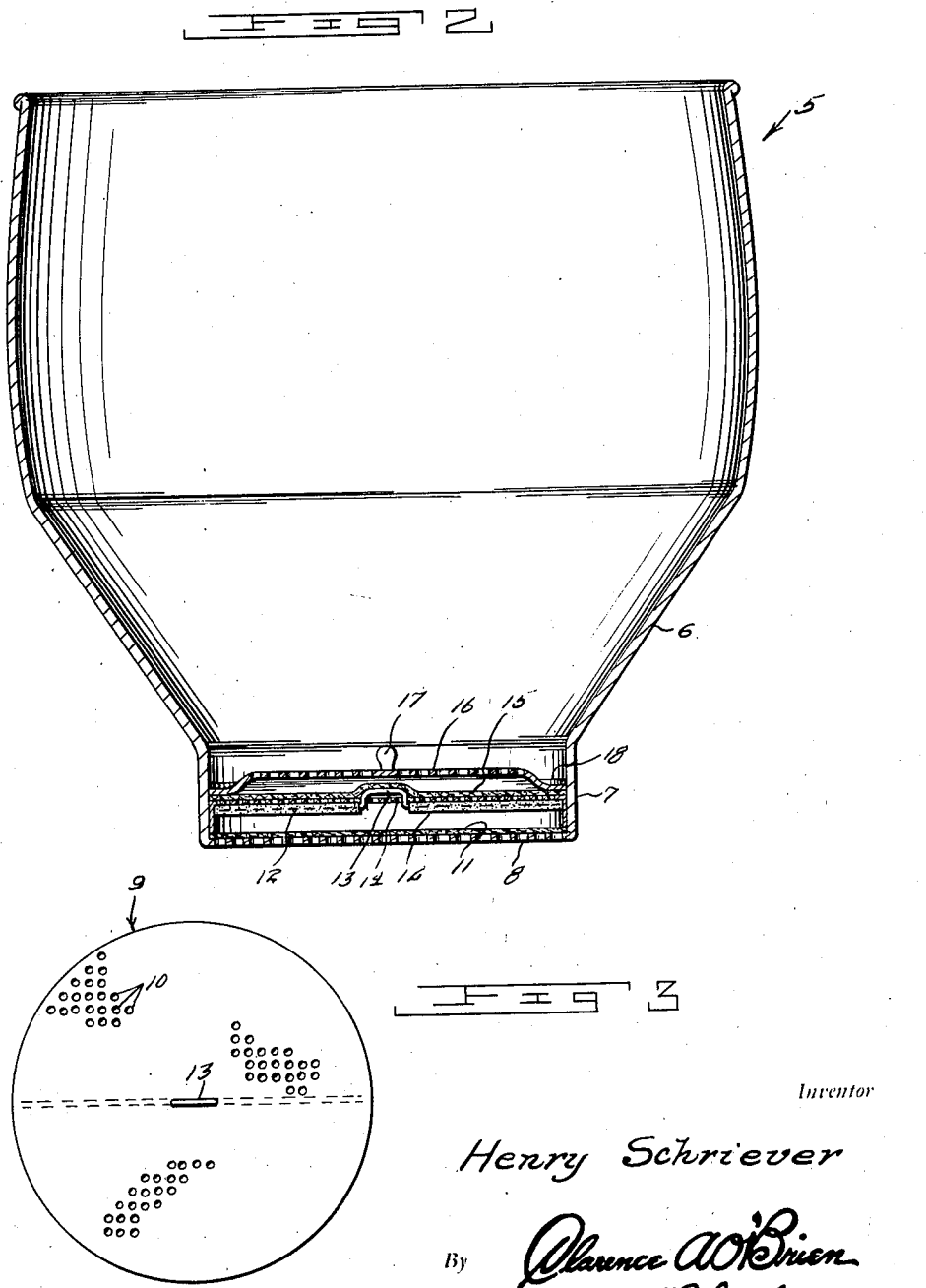
Inventor
Henry Schriever Patented June 15, 1943

2,321,776

UNITED STATES PATENT OFFICE 2,321,776

FILTER FOR MILK AND THE LIKE

Henry Schriever, Douglas, Minn.

Application May 16, 1942, Serial No. 443,251

1 Claim. (Cl. 210—158)

The invention relates to improved filter devices, and more particularly to an improved double filter device for milk, which allows of an increased speed of filtering of the milk without reduction in efficiency, and the primary object of the invention is to provide a simple and practical arrangement of this character.

Other important objects and advantages of the invention will be apparent from a reading of the following description taken in connection with the appended drawings, wherein for purposes of illustration there is shown a preferred embodiment of the invention.

In the drawings:

Figure 1 is a general top plan view of the embodiment.

Figure 2 is a general transverse vertical sectional view taken through Figure 1 along the line 2—2.

Figure 3 is a top plan view of one of the filter disks.

Figure 4 is an enlarged transverse vertical sectional view taken through Figure 3.

Figure 5 is an enlarged fragmentary transverse vertical sectional view taken through one of the filter disks.

Referring in detail to the drawings, the numeral 5 generally designates a substantially conventional form of milk filter bowl having the tapering lower portion 6 terminating at its lower end in the substantially uniformly cylindrical portion 7 which has a perforated bottom 8 on which rests, in accordance with the present invention, a shallow open bottomed cylindrical member or filter element 9 whose upper end is perforated with holes 10 as indicated in Figure 4 of the drawings. The lower edges of the side walls of the element 9 rest upon a nonmetallic fibrous or other suitable material filter disk 11.

A pair of diametrical rods are connected together by a projecting metal bail 13 which projects upwardly through a conforming opening 14 formed in the central part of the perforated top of the element 9 as indicated in Figure 2 of the drawings. A second relatively thin filter disk 15 similar to the filter disk 11 is imposed upon the top of the element 9 and is substantially conformed to the bail 13 as indicated in Figure 2 of the drawings. The rods are heavily welded at 12 to secure them to the underside and to brace the perforated top of the screen 9.

Resting upon the top of the filter disk 15 and engaging the same only at the marginal edges thereof is the upper screen which is generally designated 16 and which is inverted dish-shaped in cross section and provided on its top with a removing knob 17 by which it is easily lifted out of place. A conventional friction expanding spring ring 18 is put down upon the upper side of the marginal portion of the upper screen 16 to engage the inner sides of the cylindrical portion 7 to hold the upper screen down in place in a well known manner.

Due to the fact that the upper and lower filter disks 11 and 15, each comprising a porous fibre pad 18 overlaid by cheesecloth or the like 19, are substantially vertically spaced at a sufficient distance from each other to permit the milk to filter therethrough as though there existed only one relatively small cross section filter disk, the time of filtering the milk in accordance with the present invention is substantially reduced over the time which is required to filter the milk through the usual closely spaced or juxtaposed double filter disks.

Although there is shown and described herein a preferred embodiment of the invention, it is to be understood that it is not desired to limit the application of the invention thereto except as may be required by the scope of the subjoined claim.

Having described the invention, what is claimed as new is:

A filtering device comprising a receptacle having a cylindrical lower end provided with a perforated bottom, a filtering disk in said end resting on said bottom, a shallow open bottomed cylindrical member in said end resting on said disk and having an upper perforated screening end spaced above the disk, a second filtering disk resting on the perforated end of the member, and a second screen of dished form inverted on said second disk and having the major portion thereof perforated for screening and raised above the second disk, said filtering disks and said members being of the same diameter as the internal diameter of the lower end of the receptacle to fit snugly therein.

HENRY SCHRIEVER.